United States Patent Office 2,949,399
Patented Aug. 16, 1960

2,949,399

2-THIOCYANOMETHYL-1,2-BENZISOTHIAZOLIN-3-ONE-1,1-DIOXIDE

Chien-Pen Lo, Philadelphia, Pa., assignor to Rohm & Haas Company, Philadelphia, Pa., a corporation of Delaware No Drawing. Filed Apr. 15, 1959, Ser. No. 806,434

4 Claims. (Cl. 167—33)

The invention relates to 2-thiocyanomethyl-1,2-benzisothiazolin-3-one-1,1-dioxide and to a method for its preparation. This compound will here be given the brief name of 2-thiocyanomethylsaccharin. It is an outstanding fungicidal agent and has exhibited no evidence of phytotoxicity on growing plants.

Some thiocyanates have found use as insecticides and while it has been suggested that thiocyanates may act as fungicides, practical action of this kind is most unusual for members of this class of compounds. It is not possible to predict whether an organic thiocyanate will have fungicidal action.

This compound is prepared by reacting an N-halomethyl-1,2-benzisothiazolin-3-one-1,1-dioxide, hereinafter designated N-halomethylsaccharin, with an inorganic thiocyanate, such as ammonium, sodium, potassium, or calcium thiocyanate. The reaction is desirably carried out in an inert, volatile organic solvent, which is preferably water-miscible, such as acetone or a lower alkanol. The mixture may be heated at 50° to 125° C. The desired product may be isolated by removing solvent or precipitating it by dilution of reaction mixture with water. If desired, the product may be recrystallized.

The following preparation of N-thiocyanomethylsaccharin is typical of the process of this invention. There were mixed 23.2 parts by weight N-chloromethylsaccharin, 10 parts of potassium thiocyanate, and 60 parts of acetone. This mixture was heated under reflux for three hours. It was then poured into about 250 parts of cold water. A solid separated. It was filtered off, washed with water, and dried in air. The product, amounting to 24 parts by weight, was a white solid. It was recrystallized from ethanol and then melted at 160°–162° C. By analysis it contained 10.7% of nitrogen and 25.0% of sulfur (theory, N 11.0% and S 25.2%).

The same reaction can be effected with N-bromomethylsaccharin of N-iodomethylsaccharin, these being defined by the presence of a halogen of an atomic weight of at least 35. The preparation of these novel compounds is described in applicant's copending application Serial No. 806,433, filed on even date.

N-thiocyanomethylsaccharin may be used in dusts or sprays. Dusts may be prepared by extending this compound with a finely divided inert solid as carrier. Concentrations of 1% to 15% may be used. If desired, small proportions of a wetting agent may be incorporated.

If the proportions of these are increased somewhat, there may be prepared a wettable powder containing 20% to 50% of N-thiocyanomethylsaccharin, 1% to 5% of a wetting agent, 1% to 5% of a dispersing agent, and finely divided solid to make 100%.

For the above preparations there may be used such solids as clays, talc, pyrophyllite, diatomaceous earth, or hydrated silica. Useful wetting agents include alkaryl sulfonates, sodium lauryl sulfate, sodium sulfosuccinate, or alkylphenoxypolyethoxyethanols, and similar non-ionic surface active agents. Typical dispersing agents include lignin sulfonates and condensed naphthalene-formaldehyde sulfonates.

Solutions of N-thiocyanomethylsaccharin may also be used, particularly those which include a solvent-soluble emulsifier, such as one or more non-ionic surface active agents, of which octylphenoxypolyethoxyethanols are typical.

Other pesticidal agents may be used along with N-thiocyanomethylsaccharin, including insecticides, miticides, and other fungicides.

Evaluations were made of the fungicidal activity of N-thiocyanomethylsaccharin by the standard slide-germination method for determining fungitoxicity. It gave an $ED_{50}$ value of 5–10 p.p.m. against *Alternaria solani*, and less than 5 p.p.m. against both *Monolinia fructicola* and *Stemphylium sarcinaeforme*.

The compound was also tested for its control of late blight on tomatoes in the greenhouse. Under carefully controlled conditions the leaves of young tomato plants are sprayed with determined percentages of the agent under examination. The leaves are allowed to dry. Then a standard suspension of spores of *Phytophthora infestans* is sprayed on the leaves. The plants are held under incubating conditions. Counts of the number of lesions are made and compared with the number of lesions developed on inoculated control plants. From these data the $ED_{50}$ value is calculated.

In a set of tests it was found that N-thiocyanomethylsaccharin has an $ED_{50}$ value of 180. It was also observed that this compound has remarkable persistence under conditions of severe moisture, an $ED_{50}$ value of 156 being then found.

It is of interest to note that there were also prepared N-thiocyanoethylsaccharin and N-thiocyanohexylsaccharin. Neither of these gave evidence of practical fungicidal action. For example, N-thiocyanohexylsaccharin gave an $ED_{50}$ value above 1000 in the slide germination test, thus lacking the outstanding action of the compound of this invention.

I claim:

1. N-thiocyanomethyl-1,2-benzisothiazolin - 3-one-1,1-dioxide.

2. A process for preparing N-thiocyanomethyl-1,2-benzisothiazolin-3-one-1,1-dioxide, which comprises reacting an N-halomethyl-1,2-benzisothiazolin-3-one-1,1-dioxide with a water soluble salt of thiocyanic acid, the halogen of the N-halomethyl group having an atomic weight of at least 35.

3. A process for preparing N-thiocyanomethyl-1-2-benzisothiazolin-3-one-1,1-dioxide which comprises reacting N-chloromethyl-1,2-benzisothiazolin-3-one-1,1-dioxide with a water-soluble salt of thiocyanic acid in the presence of an inert organic solvent which is miscible with water.

4. A process of controlling fungi on living plants which comprises applying to said plants N-thiocyanomethyl-1,2-benzisothiazolin-3-one-1,1-dioxide.

References Cited in the file of this patent

FOREIGN PATENTS 1,093,728      France _____ Nov. 24, 1954